(12) United States Patent
Wang et al.

(10) Patent No.: US 8,885,562 B2
(45) Date of Patent: Nov. 11, 2014

(54) INTER-CHASSIS REDUNDANCY WITH COORDINATED TRAFFIC DIRECTION

(75) Inventors: Dawei Wang, Mountain View, CA (US); Jakob Heitz, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 231 days.

(21) Appl. No.: 13/433,196

(22) Filed: Mar. 28, 2012

(65) Prior Publication Data
US 2013/0258839 A1     Oct. 3, 2013

(51) Int. Cl.
*H04W 4/00*     (2009.01)

(52) U.S. Cl.
USPC ........... 370/328; 370/220; 370/221; 370/228; 370/250; 370/216; 370/219; 370/351

(58) Field of Classification Search
USPC ......... 370/221, 220, 328, 228, 250, 216, 219, 370/351
See application file for complete search history.

(56) References Cited

U.S. PATENT DOCUMENTS

| | | | |
|---|---|---|---|
| 4,768,188 A | 8/1988 | Barnhart et al. | |
| 5,134,691 A | 7/1992 | Elms | |
| 5,664,231 A | 9/1997 | Postman et al. | |
| 6,148,410 A | 11/2000 | Baskey | |
| 6,170,021 B1 | 1/2001 | Graf | |
| 6,216,170 B1 | 4/2001 | Giovannoni et al. | |
| 6,363,488 B1 | 3/2002 | Ginter et al. | |
| 6,366,761 B1 * | 4/2002 | Montpetit | 455/12.1 |
| 6,832,336 B2 | 12/2004 | Lal | |
| 6,938,095 B2 | 8/2005 | Basturk et al. | |
| 7,076,570 B2 | 7/2006 | Ahrens et al. | |
| 7,352,748 B1 | 4/2008 | Rozario et al. | |
| 7,406,038 B1 | 7/2008 | Oelke et al. | |
| 7,539,131 B2 | 5/2009 | Shen | |
| 7,685,254 B2 | 3/2010 | Pandya | |
| 8,243,729 B2 | 8/2012 | Subramanian et al. | |

(Continued)

FOREIGN PATENT DOCUMENTS

| | | |
|---|---|---|
| EP | 1742430 | 1/2007 |
| WO | WO-2006136193 | 12/2006 |

OTHER PUBLICATIONS

Notice of Allowance, U.S. Appl. No. 12/888,405, dated Nov. 13, 2012, 17 pages.

(Continued)

*Primary Examiner* — Ian N Moore
*Assistant Examiner* — Eric H Wang
(74) *Attorney, Agent, or Firm* — Blakely Sokoloff Taylor & Zafman LLP

(57) ABSTRACT

A method, in a first network element of an inter-chassis redundancy (ICR) system, of cooperating with a second network element of the ICR system to provide ICR. The network elements are coupled by a synchronization channel. IP addresses are announced with a favorable traffic direction attribute. It is determined that the second network element either has announced the IP addresses with an unfavorable traffic direction attribute less favorable than the favorable direction attribute, or has not announced the IP addresses. Sessions that are connected through the IP addresses are handled. Session state synchronization messages that include session state for the handled sessions are transmitted over the synchronization channel to the second network element. It is determined, after an occurrence of a failure event that inhibits the first element from handling the sessions, that the IP addresses have been announced by the second network element with a favorable traffic direction attribute.

15 Claims, 8 Drawing Sheets

(56) References Cited

U.S. PATENT DOCUMENTS

| | | |
|---|---|---|
| 2002/0091844 A1 | 7/2002 | Craft et al. |
| 2002/0131436 A1 | 9/2002 | Suri |
| 2002/0147839 A1 | 10/2002 | Boucher et al. |
| 2003/0056138 A1 | 3/2003 | Ren |
| 2003/0126195 A1 | 7/2003 | Reynolds et al. |
| 2003/0208632 A1 | 11/2003 | Rimmer |
| 2005/0114234 A1 | 5/2005 | Thomas et al. |
| 2005/0198375 A1 | 9/2005 | Hwang et al. |
| 2006/0072480 A1 | 4/2006 | Deval et al. |
| 2007/0083625 A1 | 4/2007 | Chamdani et al. |
| 2009/0089774 A1 | 4/2009 | Lynch et al. |
| 2009/0135728 A1* | 5/2009 | Shen et al. ............... 370/250 |
| 2010/0039932 A1 | 2/2010 | Wen et al. |
| 2010/0042712 A1 | 2/2010 | Lindem et al. |
| 2010/0042869 A1 | 2/2010 | Szabo et al. |
| 2010/0063996 A1 | 3/2010 | Kanemura |
| 2010/0085972 A1 | 4/2010 | Yan et al. |
| 2010/0174770 A1 | 7/2010 | Pandya |
| 2010/0220656 A1* | 9/2010 | Ramankutty et al. ......... 370/328 |
| 2010/0281157 A1 | 11/2010 | Ramankutty et al. |
| 2011/0249682 A1 | 10/2011 | Kean et al. |
| 2011/0307548 A1 | 12/2011 | Fisk et al. |
| 2012/0052958 A1 | 3/2012 | Hedrick et al. |
| 2012/0221624 A1* | 8/2012 | Gerstel et al. ................ 709/203 |

OTHER PUBLICATIONS

Notice of Allowance, U.S. Appl. No. 12/888,402, dated Nov. 14, 2012, 24 pages.

H. Saito et al., "Development of Real-Time Simulator Using Traffic Monitoring", 2000, IEEE.

Yi Zhang et al., "On the Line Card Collection Model for Bandwidth Utilization and Latency Measurement in High-Speed IP Networks", 2007, IEEE.

Non-Final Office Action, U.S. Appl. No. 12/888,402, dated Aug. 17, 2012, 13 pages.

Non-Final Office Action, U.S. Appl. No. 12/888,405, dated Aug. 22, 2012, 13 pages.

* cited by examiner

INTER-CHASSIS REDUNDANCY WITH COORDINATED TRAFFIC DIRECTION

BACKGROUND

1. Field

Embodiments of the invention relate to the field of networking; and more specifically, to reducing service outages and/or loss of network traffic in networking by providing inter-chassis redundancy.

2. Background Information

In networking it is generally desirable to prevent service outages and/or loss of network traffic. Commonly, such service outages and/or loss of network traffic may tend to occur when there is a failure in a hardware resource of a network element. For example, a control card or line card of the network element may fail.

On approach to help reduce the risks of service outages and/or loss of network traffic is to provide redundant or backup hardware resources within the network element. For example, the network element may include a pair of control cards, where one control card represents an active control card and the other control card represents a standby or backup control card. The active control card may be responsible for handling traffic, and may synchronize data sufficient to handle the traffic to the standby control card. The standby control card may serve as a hot standby or backup control card that is capable of becoming active and handling the traffic if the active control card fails.

The use of such redundant hardware resources within the network element help to provide intra-chassis redundancy. In intra-chassis redundancy, data sufficient to handle traffic is replicated to different physical hardware resources and/or different physical locations within in the chassis of the network element. Such intra-chassis redundancy generally helps to provide resilience against (e.g., prevent or at least reduce), the risks of service outages and/or loss of network traffic in the event of certain types of failures (e.g., software process crashes and/or failure of one or more backed up hardware resources within the chassis of the network element). However, such intra-chassis redundancy is incapable of preventing service outages and/or loss of network traffic in other scenarios.

SUMMARY

In one aspect, a method performed by a first network element of an inter-chassis redundancy (ICR) system is disclosed. The first network element is coupled with a second network element of the ICR system by a synchronization channel. The method is one of cooperating with the second network element to provide ICR. The method includes a step of announcing a set of Internet Protocol (IP) addresses with a favorable traffic direction attribute. The method also includes a step of determining that one of: (a) the second network element has announced the set of IP addresses with an unfavorable traffic direction attribute that is less favorable than the favorable traffic direction attribute; and (b) the second network element has not announced the set of IP addresses. There is also a step of handling sessions that are connected through the set of IP addresses. Further included is a step of transmitting session state synchronization messages over the synchronization channel to the second network element. The session state synchronization messages include session state for the handled sessions. The method additionally includes a step of determining, after an occurrence of a failure event that inhibits the first network element from handling the sessions, that the set of IP addresses have been announced by the second network element with a favorable traffic direction attribute. Advantageously, the method helps to reduce service outages and/or loss of network traffic through ICR.

In another aspect, a first network element of an ICR system is disclosed. The first network element is operable to be coupled with a second network element of the ICR system by a synchronization channel. The first network element is operable to cooperate with the second network element to provide ICR. The first network element includes at least one control card, and at least one line card coupled with the at least one control card. The at least one line card is configured to be accessible through a set of Internet Protocol (IP) addresses. The first network element includes a traffic direction module, and a traffic direction controller module operable to initially control the traffic direction module to announce the set of IP addresses with a favorable traffic direction attribute. The first network element includes an ICR state determination module operable to determine an active state for the first network element based on a determination. The determination is that one of: (a) the second network element has announced the set of IP addresses with an unfavorable traffic direction attribute that is less favorable than the favorable traffic direction attribute; and (b) the second network element has not announced the set of IP addresses. Also included in the first network element is a session handler module operable to handle sessions established through the set of IP addresses while the first network element is in the active state. A session state synchronization module of the first network element is operable to transmit session state synchronization messages over the synchronization channel to the second network element. The session state synchronization messages include session state for the handled sessions. The traffic direction controller module, after an occurrence of a failure event that is capable of inhibiting the first network element from handling the sessions, and after a determination that the second network element has announced the set of IP addresses with a favorable traffic direction attribute, is operable to control the traffic direction module to perform one of: (a) announcing the set of IP addresses with an unfavorable traffic direction attribute; and (b) not announcing the set of IP addresses. Advantageously, the first network element is operable to cooperate with the second network element to provide ICR to help to reduce service outages and/or loss of network traffic.

In yet another aspect, a method performed by a second network element of an ICR system is disclosed. The second network element is coupled with a first network element of the ICR system by a synchronization channel. The method is one of cooperating with the first network element to provide ICR. The method includes a step of performing one of: (a) announcing a set of Internet Protocol (IP) addresses with an unfavorable traffic direction attribute; and (b) not announcing the set of IP addresses. The method also includes a step of determining that the first network element has announced the set of IP addresses with a favorable traffic direction attribute that is more favorable than the unfavorable traffic direction attribute. There is also a step of receiving session state synchronization messages over the synchronization channel from the first network element. The session state synchronization messages include session state for sessions handled by the first network element. Further included is a step of determining that the set of IP addresses are no longer being announced. The method additionally includes a step of announcing the set of IP addresses with a favorable traffic direction attribute that is more favorable than the unfavorable traffic direction attribute. The method additionally includes a step of handling the sessions using the session state from the received session state synchronization messages. Advantageously, the method helps to reduce service outages and/or loss of network traffic through providing ICR.

In a still further aspect, a second network element of an ICR system is disclosed. The second network element is operable to be coupled with a first network element of the ICR system by a synchronization channel. The second network element is operable to cooperate with the first network element to provide ICR. The second network element includes at least one control card, and at least one line card coupled with the at least one control card. The at least one line card is configured to be accessible through a set of Internet Protocol (IP) addresses. The second network element also includes a traffic direction module, and a traffic direction controller module operable to control the traffic direction module to perform one of: (a) announcing the set of IP addresses with an unfavorable traffic direction attribute; and (b) not announcing the set of IP addresses. Also included in the second network element is an ICR state determination module operable to determine a standby ICR state for the second network element based on a determination that the first network element has announced the set of IP addresses with a favorable traffic direction attribute that is more favorable than the unfavorable traffic direction attribute. The second network element further includes a session state synchronization module operable to receive session state synchronization messages over the synchronization channel from the first network element. The session state synchronization messages are to include session state for sessions handled by the first network element. In response to a determination that the set of IP addresses are no longer being announced by the first network element, the traffic direction controller module is operable to control the traffic direction module to announce the set of IP addresses with a favorable traffic direction attribute that is more favorable than the unfavorable traffic direction attribute. A session handler module of the second network element is operable to handle sessions that are to be established through the set of IP addresses using the session state from the received session state synchronization messages. Advantageously, the second network element is operable to cooperate with the first network element to provide ICR to help to reduce service outages and/or loss of network traffic.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Intra-chassis redundancy, where the redundancy is contained within a single chassis of a single network element, generally tends to be incapable of preventing service outages and/or loss of network traffic in certain scenarios. For example, intra-chassis redundancy may not be able to prevent service outages and/or traffic loss when there is complete failure of hardware resources of a network element and/or complete failure of connectivity to the network element. This may occur, for example, when the network element loses power, is taken offline, is rebooted, completely fails (e.g., an active control card or other active hardware resource of the network element as well as all of its standby control cards or other redundant hardware resources fail), a communication link to the network element breaks, etc.

Disclosed herein are inter-chassis redundancy methods, apparatus, and systems. In the following description, numerous specific details are set forth, such as, for example, specific protocols (e.g., traffic direction protocols), network deployments, message types, hardware configurations, orders of operation, and component partitioning/integration options. However, it is understood that embodiments of the invention may be practiced without these specific details. In other instances, well-known circuits, structures and techniques have not been shown in detail in order not to obscure the understanding of this description.

Figure 1:
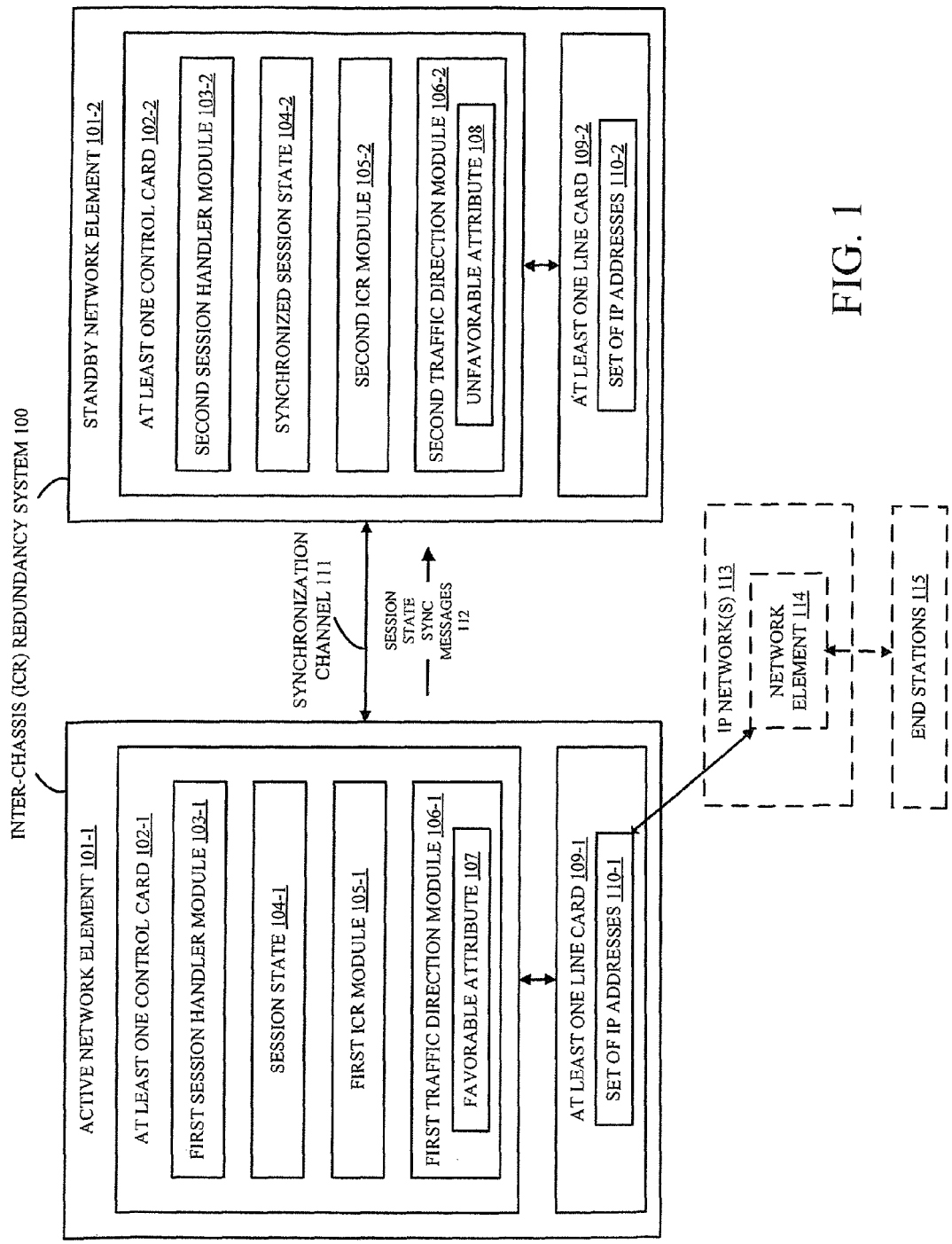
FIG. 1 is a block diagram of an embodiment of an inter-chassis redundancy (ICR) system.

FIG. 1 is a block diagram of an embodiment of an inter-chassis redundancy (ICR) system 100. The ICR system includes a first, active network element 101-1 and a second, standby network element 101-2. In the illustrated embodiment, the first network element is the active network element, and the second network element is the standby network element, although as described below the roles may be reversed in other circumstances. The active and standby network elements have separate chassis which may or may not be located in different geographical locations. The first and second network elements do not need to be the same (e.g., have the same hardware, size, etc.), but commonly are dimensioned to support at least most of the sessions handled by the other. Each network element may be reachable by subscribers or end stations that establish sessions with the other. The active and standby network elements are coupled or otherwise in communication with one another by a synchronization channel 111.

As used herein, a network element (e.g., a router, switch, bridge, gateway, etc.) is a piece of networking equipment, including hardware and software, which communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are often provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), communications sessions, and/or corporate networks over VPNs. Typically, subscriber end stations are coupled to edge network elements, which are coupled (e.g., through one or more core network elements) to other edge network elements, which are coupled to other end stations.

Network elements are commonly separated into a control plane and a data plane (sometimes referred to as a forwarding plane or a media plane). Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Referring again to the illustration, the active network element 101-1 includes at least one control card 102-1 and at least one line card 109-1. The standby network element 101-2 includes at least one control card 102-2 and at least one line card 109-2. The line card(s) of the active network element are reachable though a set of Internet Protocol (IP) addresses (e.g., virtual IP addresses) 110-1. The line card(s) of the standby network element are reachable though a set of IP addresses (e.g., virtual IP addresses) 110-2. In some embodiments the sets of IP addresses 110-1, 110-2 include the same set of IP addresses.

The active network element includes a first ICR module 105-1 and a first traffic direction module 106-1. The standby network element includes a second ICR module 105-2 and a second traffic direction module 106-2. The first ICR module 105-1, when the first network element 101-1 is the active network element, is operable to control the first traffic direction module 106-1 to announce the set of IP addresses 110-1 with a favorable traffic direction attribute 107. The second ICR module 105-2, when the second network element 101-2 is the standby network element, is operable to control the second traffic direction module 106-7 to announce the set of IP addresses 110-2 with an unfavorable traffic direction attribute 108, or not announce them. As used herein, the terms "favorable" and "unfavorable" are relative not absolute terms (i.e., the favorable traffic direction attribute is more favorable than the unfavorable traffic direction attribute). Each of the traffic direction modules is operable to direct, divert, or influence traffic on the respective line cards.

In embodiments where the network elements are routers (or implement routing functionality), the control plane or control card(s) typically determines how data (e.g., packets) is to be routed (e.g., the next hop for the data and the outgoing port for that data), and the data plane or line card(s) are in charge of forwarding that data. The control planes may each include one or more routing protocols, which communicate with other network elements to exchange routes and select those routes based on one or more routing metrics. Examples of suitable routing protocols include, but are not limited to, Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)). Routes and adjacencies may be stored in one or more routing structures (e.g., Routing Information Base (RIB), Label Information Base (LIB), one or more adjacency structures) on the control plane. The control plane may program the data plane with information (e.g., adjacency and route information) based on the routing structure(s). The data plane may use these forwarding and adjacency structures when forwarding traffic. Each of the routing protocols may download route entries to a main RIB based on certain route metrics (the metrics can be different for different routing protocols). Each of the routing protocols may store the route entries, including the route entries which are not downloaded to the main RIB, in a local RIB (e.g., an OSPF local RIB). A RIB module that manages the main RIB may select routes from the routes downloaded by the routing protocols (based on a set of metrics) and download those selected routes (sometimes referred to as active route entries) to the data plane. The RIB module may also cause routes to be redistributed between routing protocols. These are just a few examples and other configurations may alternatively be used.

In some embodiments, the traffic direction modules are routing protocol modules that are operable to influence routing decisions, for example by changing one or more routing protocol metrics. For example, the traffic direction module 106-1 of the active network element 101-1 may direct traffic into the IP addresses 110-1 by making a routing protocol metric corresponding to the IP addresses look favorable relative to those of the standby network element 101-2. In some embodiments, the standby network element may not announce or advertise its IP addresses. To the IP network 113, this may make routing to the line card(s) of the active network element 101-1 favorable or desirable as compared to routing to the line card(s) of the standby network element, such that the traffic goes to the active network element. Often, the routing protocol metrics may quantify or qualify the quality of routing to the network elements, such as, for example, quantify a number of hops, quantify network congestion, quantify hop costs, etc. By way of example, to direct traffic away from a network element, a metric may be adjusted to make, for example, a number of hops look excessively high, a network congestion look excessively bad, a hop cost look excessively high, etc. The aforementioned routing protocols are examples of suitable routing protocols.

To further illustrate, in the case of BGP there are different ways to influence the routing decision. In some embodiments, Autonomous System (AS) path length may be used to influence the routing decision (e.g., a longer AS path length may be used for the network element which is to be standby than for the network element which is to be active). In some embodiments, relatively more AS path prepends may be used for the network element that is to be standby than for the network element that is to be active. In general, a route having more AS path prepends tends to be less desirable than a route having fewer AS path prepends. Use of AS path prepends may allow both network elements to have the same prefixes, but only have traffic routed to the network element having the fewer AS path prepends. As another option, in other embodiments, the active and standby network elements may be configured with different BGP communities in order to influence the routing decision (e.g., cause traffic to be preferentially routed to the active network element). The active network element may advertise its IP addresses with the configured BGP community. The next hop network element may set a local preference based on the BGP community through the route map such that the active network element will be chosen based on the local preference. These are just a few illustrative examples.

In other embodiments, the traffic direction modules are Layer 2 traffic direction modules operable to use a Layer 2 traffic direction protocol to direct traffic. For example, Layer 2 traffic direction may be manipulated through manipulation of a virtual Media Access Control (MAC) address corresponding to a next hop for the IP prefix for Virtual Router Redundancy Protocol (VRRP)). As another example, Layer 2 traffic direction may be achieved in Link Aggregation Group (LAG) based protocols, such as, for example, Link Aggregation Control Protocol (LACP), where multiple Ethernet links are aggregated together, and traffic may be directed away from one or more of the Ethernet links. When using an L2 protocol (e.g., LACP) to redirect traffic, links of a LAG group corresponding to a particular IP address may be switched on or off. For L2 protocol like LACP, the MC-LAG (Multi-chassis LAG) may be enabled between active and standby network elements. The LACP protocol may be used to make a link of particular MC-LAG to be standby on one network element, and the link of the same MC-LAG on another network element to be active. MC-LAG on both network elements will share the same IP address and the pathway through LACP may be enabled to that IP address. Still further examples of directing traffic include those performed for Bidirectional Forwarding Detection (BFD) protocol.

The network element announcing the most favorable traffic direction attribute for the IP addresses or subnet will be selected as the active network element and will handle all sessions for the IP addresses or subnet. The network element with the less favorable traffic direction attribute will be selected as the standby network element. As a result of the first network element 101-1 announcing the favorable traffic direction attribute 107 for the IP addresses 110-1 and the second network element 101-2 either announcing the unfavorable traffic direction attribute 108 for the IP addresses 110-2 or not announcing the IP addresses 110-2, network traffic is directed to the active network element 101-1. As shown, end stations 115 may establish connections (e.g., sessions) with the IP addresses 110-1 of the active network element 101-1 through one or more IP networks 113 including through a network element 114 connected next hop to the active network element.

The first network element 101-1 includes a first session handler module 103-1 that is operable to handle sessions or network traffic established through the set of IP addresses 110-1, while the first network element is active. The second network element 101-1 includes a second session handler module 103-2 that is operable to handle sessions or network traffic in an alternate configuration in which the second network element is active. The type of session handler module varies depending upon the particular implementation of the ICR system (e.g., the network in which it is deployed, etc.). In some embodiments, as will be explained further below, the ICR system may be deployed in a mobile backhaul (e.g., an LTE (long term evolution) wireless network), and the session handler modules may be Evolved Packet Core (EPC) modules (e.g., operable to implement Serving Gateway and/or Packet Data Network (PDN) Gateway functionalities. The active network element 101-1 includes session state 104-1, which represents network traffic data or state that is used to handle the sessions or network traffic.

The first and second network elements are coupled, or otherwise in communication, by the synchronization channel 111. In some embodiments, the synchronization channel may represent a dedicated peer-to-peer channel that may be implemented over the same network that is used to handle the network traffic or sessions (e.g., each network element may have one IP address and reserved port for the synchronization channel), although this is not required. The first and second ICR modules are operable to cause the first and second network elements to exchange session state synchronization messages over the synchronization channel. As shown, when the first network element 101-1 is active, the first, active network element may send session state synchronization messages 112 to the second, standby network element. The session state synchronization messages 112 may include or represent the session state 104-1. Examples of suitable protocols for the messages include, but are not limited to, UDPs (User Datagram Protocols), TCPs (Transmission Control Protocols), and other packet transmission protocols known in the arts. UDP has the advantage of being connectionless and facilitates routing to applications of different types that are to use the session state. In some embodiments, the state information may be included in TLV (Type Length Value) information elements within the state synchronization messages. The second, standby network element may store or otherwise preserve the session state and/or synchronization data received in the session state synchronization messages as a synchronized session state 104-2. The synchronized session state 104-2 may represent a replica, redundant set, or copy of the session state 104-1. The synchronized session state 104-2 may allow the second network element 101-2 to be operable to become active and handle the existing sessions already established with the first, active network element 101-1 when an event occurs that is sufficient to prevent the first, active network element 101-1 from handling the sessions.

Figure 2:
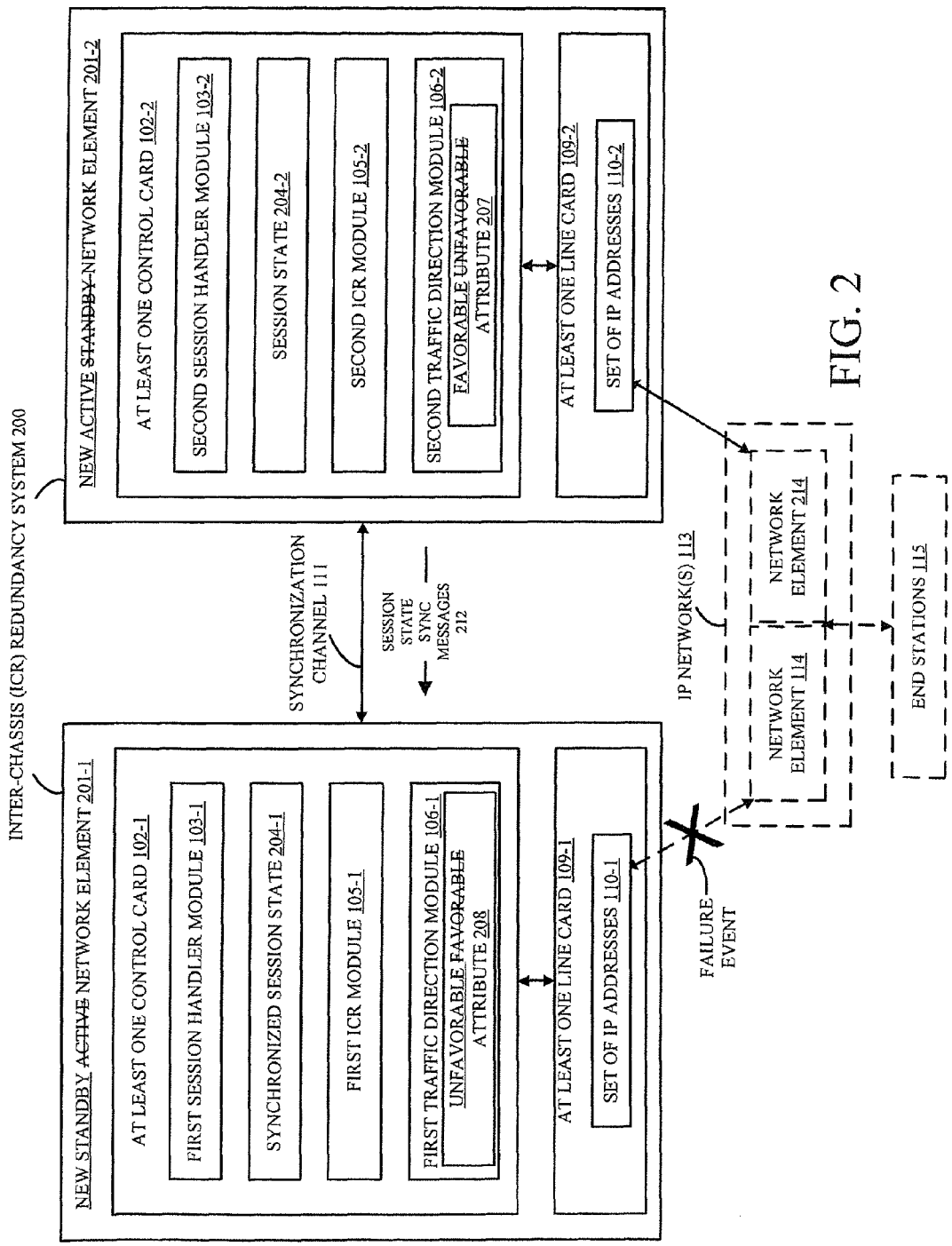
FIG. 2 is a block diagram of an embodiment of an ICR system representing the ICR system of FIG. 1 after an ICR switchover following a failure event.

FIG. 2 is a block diagram of an embodiment of an ICR system 200 representing the ICR system 100 of FIG. 1 after an ICR switchover following a failure event. The ICR system 200 includes a first, new standby (former active) network element 201-1 and a second, new active (former standby) network element 201-2. For concise description, the different or additional features of the ICR system 200 will be discussed without repeating all of the similarities with respect to the ICR system 100, although it is to be understood that the features for the ICR system 100 also apply, except where inappropriate, to the ICR system 200.

A failure event has occurred at the first network element 202-1. The failure event is sufficient to prevent the first network element from handling the sessions. Examples of such events include, but are not limited to, the first network element or a critical portion thereof failing, the first network element or a critical portion thereof being taken offline (e.g., by a network operator in order to perform maintenance or an upgrade), the first network element rebooting, breaks in a communication link leading to the first network element, loss of power to the first network element, network operator induced switchovers (e.g., through a command-line interface (CLI) command), etc.

The second ICR module 105-2 and/or the second network element 201-2 may be operable to detect or determine that the failure event has occurred. By way of example, during such an event, the network element 114 directly connected to the first network element 201-1 may detect the loss of the IP addresses 110-1. The second network element 201-2 may also detect the loss of the IP addresses 110-1 (e.g., determine that they are no longer being advertised or announced through the IP network 113). In some embodiments, the first and second network elements may also or alternatively exchange messages (e.g., keepalive messages or state indication messages), for example over the synchronization channel 111, which may allow them to monitor each other's status and determine when a failure event has occurred. In response to noticing the failure event, the second ICR module 105-2 may cause the second network element 201-2, if it was not already doing so, to announce its IP addresses 110-2, potentially with a favorable traffic direction attribute 207 that is more favorable than the former unfavorable attribute 108. The second network element 201-2 may transition to active, and after network convergence the sessions or network traffic may be directed through the IP network(s) 113 and a next hop network element 214 to the second now active network element. The second now active network element may virtually seamlessly begin handling the sessions using the session state 204-2 derived from synchronized session data 104-2.

The first network element 201-1, if and when it is able to do so, may transition to the new standby (former active) network element. This first ICR module 105-1 may cause the first traffic direction module 106-1 to advertise the IP addresses 110-1 with an unfavorable traffic direction attribute 208. The first, new standby network element 201-1, if and when it is able to do so, may then begin receiving session state synchronization messages 212 from the second, new active network element 201-2. The first, new standby network element may store or otherwise preserve synchronized session state 204-1 so that it may serve as a redundant backup if a failure event subsequently occurs at the second network element. Alternatively, in another embodiment, the first network element 201-1, if and when it is able to do so, may resume an active role as soon as it is able.

Advantageously, the ICR system may help to prevent, or at least reduce, service outages and/or loss of network traffic when the various different types of failure events occur. Such events are generally not sufficiently protected against by an intra-chassis redundancy system. Moreover, the resilience and/or the switchover of active roles from the first to the second network element may be essentially transparent to the end stations 115. The end stations may not be aware, or not need to be aware, that it is connecting to a different network element when such an event occurs. In some cases, the ICR system may represent a geographically distributed ICR system to provide geographical redundancy of session or network traffic data. The first and second network elements 201 may reside at different geographical locations, which are remotely located from one another (e.g., locations at least several miles apart, different towns or cities, different states, different countries, etc.). Such a geographically distributed ICR system may help to prevent, or at least reduce, service outages and/or loss of network traffic, when geographically localized disruption of service occurs (e.g., due to catastrophic weather, local loss of power, or other geographically localized events occurring at one but typically not both geographical locations).

Figure 3:
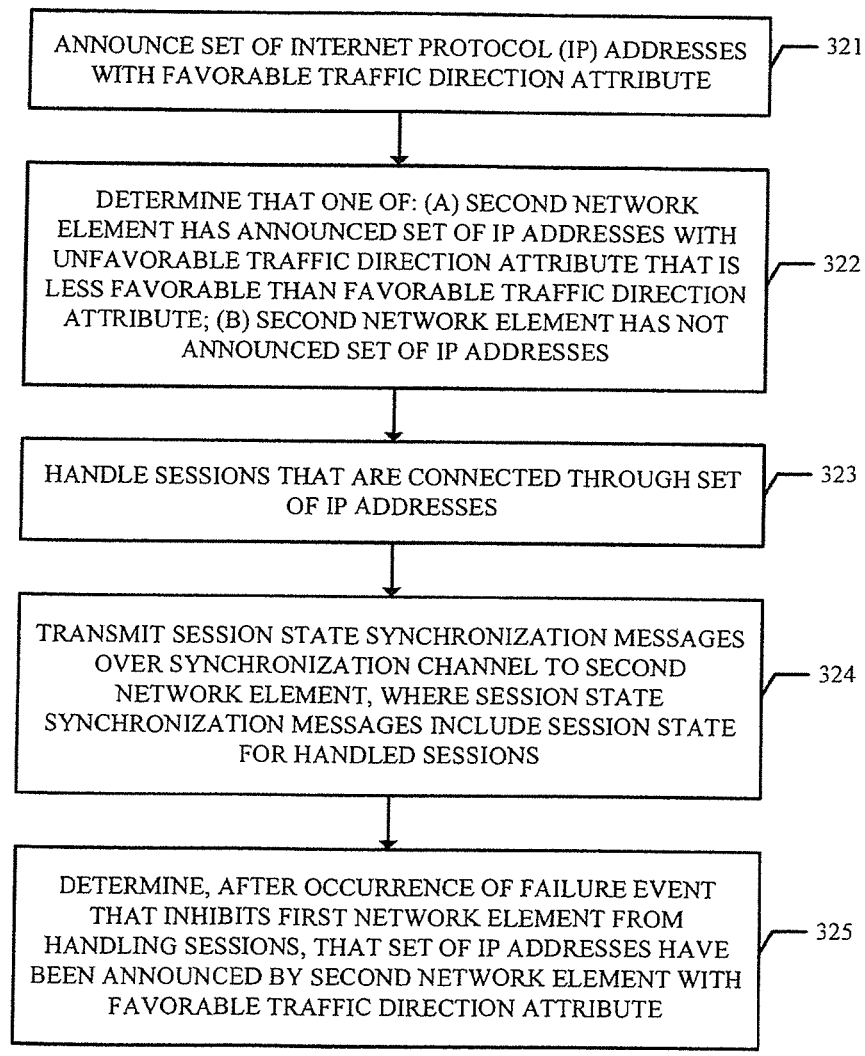
FIG. 3 is a block flow diagram of an embodiment of a method, which is performed by a first network element of an ICR system that is active prior to a failure event, of cooperating with a second network element of the ICR system that is standby prior to the failure event, to help prevent service outages and/or loss of network traffic due to the failure event.

FIG. 3 is a block flow diagram of an embodiment of a method 320, which is performed by a first network element of an ICR system that is active prior to a failure event, of cooperating with a second network element of the ICR system that is standby prior to the failure event, to help prevent service outages and/or loss of network traffic due to the failure event. The operations of the method 320 are described with reference to the active network element 101-1 of FIG. 1. However, it is to be understood that the operations of the method 320 can be performed by embodiments of the invention other than the active network element 101-1. Moreover, the active network element 101-1 can perform operations and methods different than those of the method 320.

A set of IP addresses are announced with a favorable traffic direction attribute, at block 321. In some embodiments, the first ICR module 105-1 may control the first traffic direction module 106-1 to announce the set of IP addresses 110-1 with the favorable traffic direction attribute 107. In one particular embodiment, the first traffic direction module 106-1 is a BGP routing protocol module that announces a set of virtual IP addresses with a favorable BGP metric. In some embodiments, the first session handler module 103-1 may indicate to the first ICR module 105-1 when it is ready to handle sessions.

At block 322, a determination is made that one of: (a) the second network element has announced the set of IP addresses with an unfavorable traffic direction attribute that is less favorable than the favorable traffic direction attribute; or (b) the second network element has not announced the set of IP addresses. The favorable and unfavorable attributes are relative not absolute terms in which the unfavorable attribute is less favorable than the favorable attribute. In some embodiments, the first traffic direction module 106-1 may make this determination. In some embodiments, the first traffic direction module 106-1 may notify the first ICR module 105-1 of this determination to allow the first ICR module to determine what ICR state (e.g., active or standby) it should have. In some embodiments, the first network element may attempt to detect the second network element during a peer detection time, which may be configurable, and which may depend upon factors such as the network convergence time. In an embodiment, the first network element may become active if the peer detection time expires without the second network element having been detected.

Sessions that are connected through the set of IP addresses are handled, at block 323. By way of example, the first session handler module 103-1 may handle the sessions that are connected through the set of IP addresses 110-1. The scope of the invention is not limited to any known particular type of session handler module, but rather this may vary from one implementation (e.g., network deployment) to another. In one particular example, the sessions may be handled by an EPC module or process within a mobile backhaul, although the scope of the invention is not so limited.

Session state synchronization messages are transmitted over a synchronization channel to the second network element, at block 324. The first network element is coupled or in communication with the second network element by the synchronization channel. The session state synchronization messages include session state for the handled sessions. In some embodiments, the first ICR module 105-1 transmits the session state synchronization messages 112 over the synchronization channel 111. In some embodiments, the session state synchronization messages are transmitted by a UDP or TCP based protocol, although the scope of the invention is not so limited.

In some embodiments, session state may be synchronized from the active network element to the standby network element when sessions reach steady state. Steady state may represent the point at which session request-response signaling is complete. In some embodiments, session state synchronization may include an initial bulk session state synchronization and multiple dynamic session state synchronizations. Initially it may take some time to bring both network elements up to a point that they are ready to exchange synchronization information. A number of sessions may initially be established prior to session state synchronization messages being exchanged. The initial bulk session state synchronization may synchronize session state for all sessions established prior to the first exchange of session state synchronization messages. Subsequently, dynamic session state synchronizations may take place over time to reflect new sessions, removed sessions, changed sessions, etc. These dynamic session state synchronizations may be performed on a timing appropriate for the particular implementation (e.g., continuously, triggered by session state changes, periodically, at scheduled or coordinated times, etc.). In some aspects, the session state synchronization messages may be un-acknowledged, or in other aspects they may be acknowledged.

At block 325, after an occurrence of a failure event that inhibits the first network element from handling the sessions, a determination is made that the set of IP addresses have been announced by the second network element with a favorable traffic direction attribute. This favorable traffic direction attribute is more favorable than the unfavorable traffic direction attribute previously determined at block 322. Such a determination may indicate that the second network element may be in an active state handling the sessions. In some embodiments, the first traffic direction module 106-1 may make this determination. In some embodiments, the first traffic direction module 106-1 may notify the first ICR module 105-1 of this determination to allow the first ICR module 105-1 to determine what ICR state (e.g., active or standby) it should have. Advantageously, such a method performed by the first network element that is active prior to a failure event of cooperating with the second network element that is standby prior to the failure event may help to prevent, or at least reduce, service outages and/or loss of network traffic due to the failure event.

Figure 4:
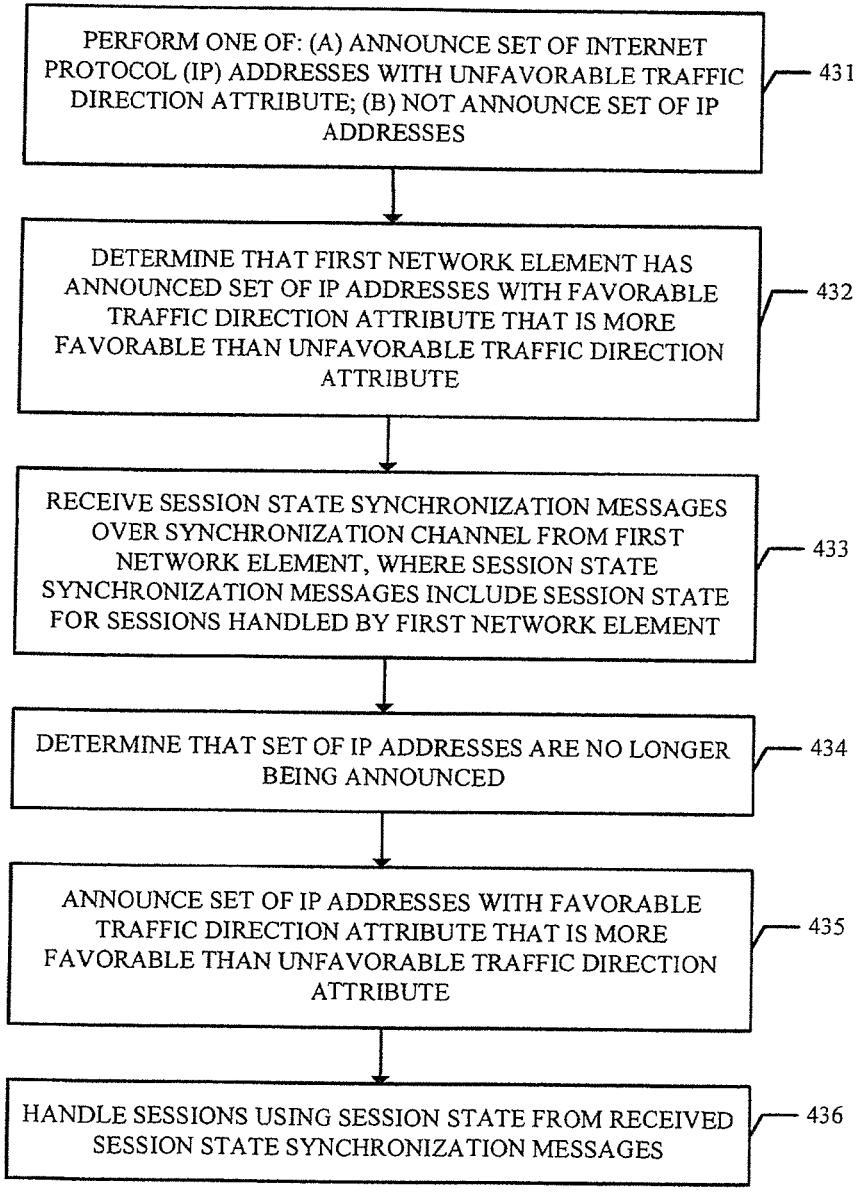
FIG. 4 is a block flow diagram of an embodiment of a method, which is performed by a second network element of an ICR system that is standby prior to a failure event, of cooperating with a first network element of the ICR system that is active prior to the failure event, to help prevent service outages and/or loss of network traffic due to the failure event.

FIG. 4 is a block flow diagram of an embodiment of a method 430, which is performed by a second network element of an ICR system that is standby prior to a failure event, of cooperating with a first network element of the ICR system that is active prior to the failure event, to help prevent service outages and/or loss of network traffic due to the failure event. The operations of the method 430 are described with reference to the standby network element 101-2 of FIG. 1 and the new active (former standby) network element 201-2 of FIG. 2. However, it is to be understood that the operations of the method 430 can be performed by embodiments of the invention other than the network elements 101-2/201-2. Moreover, the network elements 101-2/201-2 can perform operations and methods different than those of the method 430.

At block 431, one of the following is performed: (a) announcing a set of IP addresses with an unfavorable traffic direction attribute; and (b) not announcing the set of IP addresses. In some embodiments, the second ICR module 105-2 may control the second traffic direction module 106-2 to announce the set of IP addresses 110-2 with the unfavorable traffic direction attribute 108, or not announce the set of IP addresses. In one particular embodiment, the second traffic direction module 106-2 is a BGP routing protocol module.

A determination is made that the first network element has announced the set of IP addresses with a favorable traffic direction attribute, which is more favorable than the unfavorable traffic direction attribute, at block 432. The favorable and unfavorable attributes are relative not absolute terms. In some embodiments, the second traffic direction module 106-2 may make this determination. In some embodiments, the second traffic direction module 106-2 may notify the second ICR module 105-2 of this determination to allow the second ICR module to determine what ICR state (e.g., active or standby) it should have.

Session state synchronization messages are received over the synchronization channel from the first network element, at block 433. The session state synchronization messages include session state for sessions handled by the first network element. In some embodiments, the second ICR module 105-2 receives the session state synchronization messages 112 over the synchronization channel 111. In some embodiments, the session state synchronization messages are received in a UDP or TCP based protocol, although the scope of the invention is not so limited.

A determination is made that the set of IP addresses are no longer being announced, at block 434. Such a determination may tend to indicate that a failure event has occurred. The first, active network element should continue to announce the set of IP addresses so long as it is able to handle sessions. Disappearance of these IP address announcements may be taken as indicative of a failure event. In some embodiments, the second traffic direction module 106-2 may make this determination. In some embodiments, the second traffic direction module 106-2 may notify the second ICR module 105-2 of this determination to allow the second ICR module to determine what ICR state it should have (e.g., that it should transition to active).

The set of IP addresses are announced with a favorable traffic direction attribute, at block 435. The favorable traffic direction attribute is more favorable than the unfavorable traffic direction attribute of block 431. The announced favorable attribute need not necessarily be the same as the favorable attribute determined at block 432. In some embodiments, the second ICR module 105-2 may control the second traffic direction module 106-2 to announce the set of IP addresses 110-2 with the favorable traffic direction attribute 207.

The sessions are handled using the session state from the received session state synchronization messages, at block 436. After network convergence, the sessions or network traffic are directed t the second, now active network element to the set of IP addresses 110-2. By way of example, the second session handler module 103-2 may handle the sessions that are connected through the set of IP addresses 110-2 using the session state 204-2 derived from the synchronized session state 104-2. As before, the scope of the invention is not limited to any known particular type of session handler module, but rather this may vary from one implementation (e.g., network deployment) to another. In one particular example, the sessions may be handled by an EPC module or process within a mobile backhaul, although the scope of the invention is not so limited. Advantageously, such a method performed by the second network element that is standby prior to the failure event of cooperating with the first network element that is active prior to the failure event may help to prevent, or at least reduce, service outages and/or loss of network traffic due to the failure event.

Figure 5:
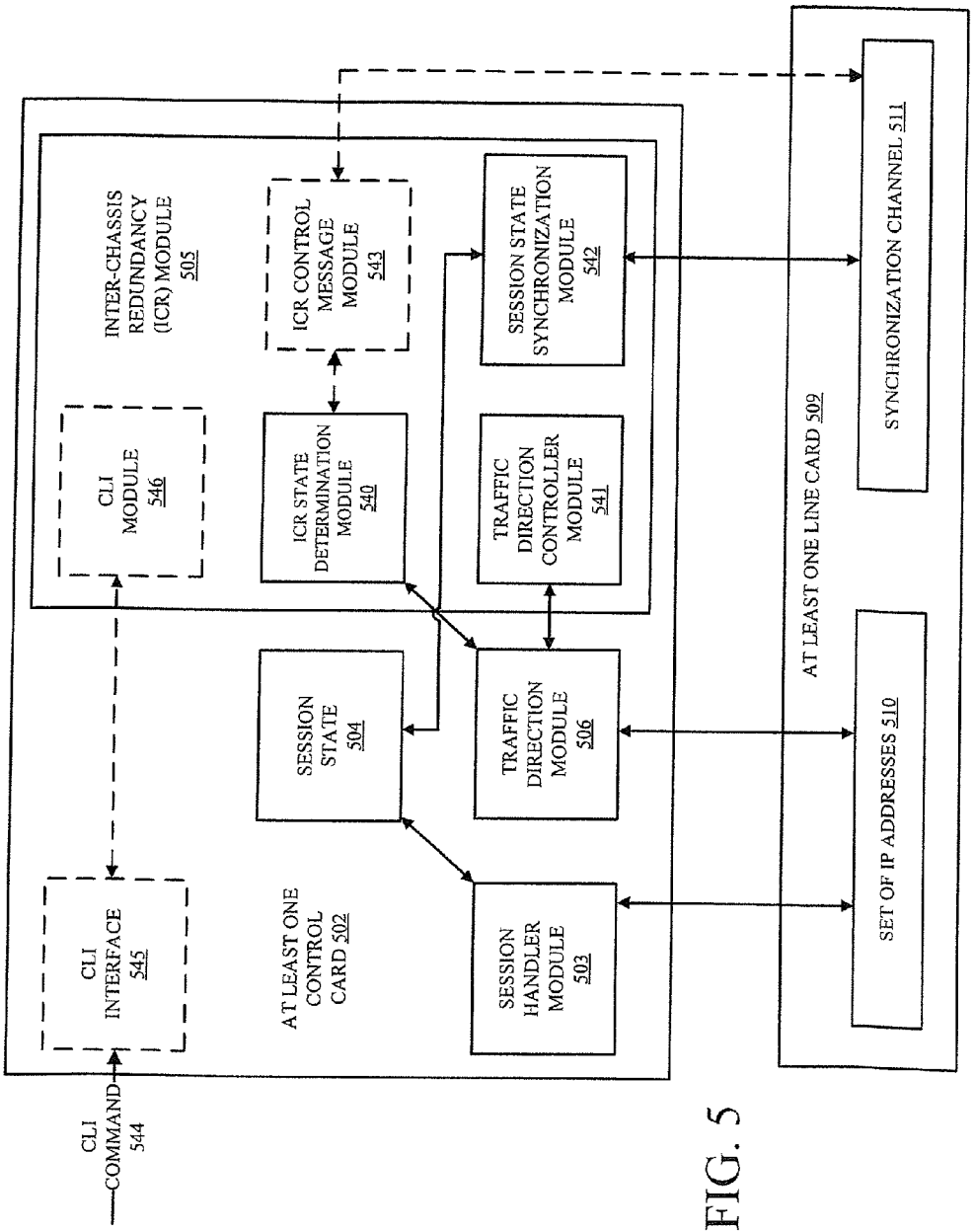
FIG. 5 is a block diagram of an embodiment of a network element for an ICR system that includes a detailed embodiment of an ICR module.

FIG. 5 is a block diagram of an embodiment of a network element 501 for an ICR system that includes a detailed embodiment of an ICR module 505. The network element 501 is suitable for both active and standby network elements.

The network element 501 may perform the method 320 of FIG. 3 and/or the method 430 of FIG. 4. Alternatively, the network element 501 may perform other operations or methods. Moreover, the methods 320 and 430 may be performed by other network elements.

The network element includes at least one control card 502, and at least one line card 509 that is coupled or in communication with the at least one control card. The at least one line card is configured to be accessible or reachable through a set of IP addresses 510. In the illustrated embodiment, the at least one line card is also configured to provide a synchronization channel 511 to another network element participating in the ICR system, although this is not required (e.g., a separate dedicated channel may be provided).

The network element includes a traffic direction module 506 coupled or in communication with the at least one line card. The traffic direction module is operable to direct traffic that is exchanged through the set of IP addresses. In one embodiment, the traffic direction module is a Layer 2 traffic direction module. In another embodiment, the traffic direction module is a Layer 3 traffic direction module. The previously mentioned types are suitable.

The network element also includes a session handler module 503 coupled with the at least one line card. The session handler module is operable to handle sessions established through the set of IP addresses, while the network element is in the active state. The session handler module 503 is coupled or in communication with session state 504 used to handle the sessions.

The ICR module 505 includes a traffic direction controller module 541. The traffic direction controller module is coupled or in communication with the traffic direction module 506.

Depending upon whether the network element is configured and/or preferred to be active or standby, the traffic direction controller module is operable to control the traffic direction module to announce the set of IP addresses with a particular traffic direction attribute, or not announce the set of IP addresses in the case of standby being preferred. For example, when the network element is configured to be active, the traffic direction controller module may be operable to control the traffic direction module to announce the set of IP addresses with a relatively favorable traffic direction attribute (more favorable than the other network element will announce) to cause the network element to wind up active. Moreover, when the network element is active when a failure event occurs, in some embodiments, after a determination that the other network element has announced the set of IP addresses with a favorable traffic direction attribute, the traffic direction controller module may be operable to control the traffic direction module to either announce the set of IP addresses with an unfavorable traffic direction attribute, or not announce the set of IP addresses.

Conversely, when the network element is configured to be standby, the traffic direction controller module may be operable to control the traffic direction module to announce the set of IP addresses with a relatively unfavorable traffic direction attribute (less favorable than the other network element will announce), or not announce the set of IP addresses at all. So long as the other network element is detected to announce the IP addresses with a more or sufficiently favorable attribute within a certain amount of time (e.g., a peer detection time) this may cause the network element to wind up standby. Moreover, when the network element is standby when a failure event occurs, in some embodiments, in response to a determination that the set of IP addresses are not being announced by the other network element, the traffic direction controller module may be operable to control the traffic direction module to improve the traffic direction attribute and announce the set of IP addresses with the improved or favorable traffic direction attribute.

Referring again to the illustration, the ICR module 505 includes an ICR state determination module 540. The ICR state determination module is coupled or in communication with the traffic direction module 506 and is operable to determine a state for the network element (e.g., active or standby) based on information from the traffic direction module. The ICR state determination module may monitor, through the traffic direction module, whether or not the other network element announces a better traffic direction metric for the IP addresses. For example, the ICR state determination module may determine an active state for the network element based on a determination that one of: (a) the other network element has announced the set of IP addresses with an unfavorable traffic direction attribute that is less favorable than a traffic direction attribute announced for the IP addresses by the network element; and (b) the other network element has not announced the set of IP addresses within a certain amount of time (e.g., a peer detection time). As another example, the ICR state determination module may determine a standby state for the network element based on a determination that the other network element has announced the set of IP addresses with a favorable traffic direction attribute that is more favorable than an unfavorable traffic direction attribute that the network element has announced the IP addresses with.

The ICR module 505 includes a session state synchronization module 542. The session state synchronization module is coupled or in communication with the session state 504 and with the synchronization channel 511. The session state synchronization module is operable to transmit and/or receive session state synchronization messages over the synchronization channel.

In some embodiments, the ICR module 505 may include an optional ICR control message module 543, although this is not required. The ICR control message module 543 is operable to exchange ICR control messages, other than session state synchronization messages, with the other network element over the synchronization channel. The ICR control messages may include, but are not limited to, keepalive messages, heart-beat signaling messages, other existence indication messages, ICR state indication messages, etc. Such messages may help to resolve or avoid a so-called split-brain scenario where each network element thinks it is active.

In some embodiments, the ICR module 505 may optionally include a Command Line Interface (CLI) module, although this is not required. The network element may include a CLI interface 545 to receive CLI commands 544. The CLI module may interface with the CLI interface to help receive and implement CLI commands associated with control and/or configuration of the ICR module and/or ICR system. In various embodiments, CLI commands may be provided to configure various aspects of the ICR system (e.g., traffic direction attributes, peer detection times, IP addresses, etc.), to force a switchover from active to standby, to query for status or statistics about the ICR system (e.g., ICR state, history, ICR configuration, traffic direction attributes), etc.

In some embodiments, the session handler module 503, the traffic direction module 506, the traffic direction controller module 541, the ICR state determination module 540, the session state synchronization module 542, the ICR control message module 543, and the CLI module 546 may be implemented on a control plane (e.g., as software running on the control plane). As another option, some or all of these components may be implemented at least partially in firmware, or hardware (e.g., circuitry) on the control plane (e.g., on one or more control cards).

Many traffic direction protocols, such as, for example, BGP, OSPF, LACP, and VRRP, have built in failure detection mechanisms. The amount of time may depend on factors such as configured route advertisement intervals, number of routes, how busy network elements are, etc. However, commonly these failure detection mechanisms are only capable of detecting failures on a time frame of not within a second and commonly several seconds. By way of example, when BGP is used for traffic direction, it commonly takes several seconds for BGP to detect a failure and re-converge traffic routing to the new active (former standby) network element.

In some embodiments, a fast failure detection protocol, such as, for example, a Bidirectional Forwarding Detection (BFD) protocol, may be used to obtain fast failure detection and/or to allow faster switchover of a standby network element to active. BFD is a network protocol that may be used to detect faults between two forwarding engines connected by a link. BFD is described in RFC 5880. RFC 5881 describes BFD's operation with OSPF and IS-IS protocols. BFD may establish a session between two endpoints over a particular link. BFD may be used on many different underlying transport mechanisms and layers and may be encapsulated by a transport it uses. BFD may run in a unicast point-to-point mode. BFD packets may be carried as the payload of an encapsulating protocol used for the medium and network. BFD may implement a Hello protocol for failure detection. A pair of forwarding elements may transmit BFD packets periodically over a path between them. If one of the elements stops receiving the BFD packets for a long enough period of time then it may assume that a failure has occurred in the bidirectional path. In some embodiments, BFD over Link Aggregation Group (LAG) may be used to provide faster failure detection. The BFD may be used on the physical link over a LAG between the active network element and the next hop network element. BFD may detect LAG constituent link failure (e.g., when one of the connected network elements determines that BFD packets are not being received). The use of BFD for fast failure detection may often allow failure detection within a second or less (e.g., commonly less than 500 ms). Alternatively, other protocols derived from BFD, other protocols based on BFD, other protocols expanding on BFD, or other protocols representing alternatives to BFD, may alternatively be used.

In some embodiments, more than two different traffic direction attribute levels may optionally be used for the set of IP addresses (i.e., more than just one level corresponding to an active state and another level corresponding to a standby state). In some embodiments, four different traffic direction attribute levels may be used for the ICR handled IP addresses. In order from most favored to less favored these levels may be referred to as "active," "preferred active," "preferred standby," and "standby." Advantageously, using more than two levels may help to avoid problems associated with race conditions during concurrent startup of network elements.

Figure 6:
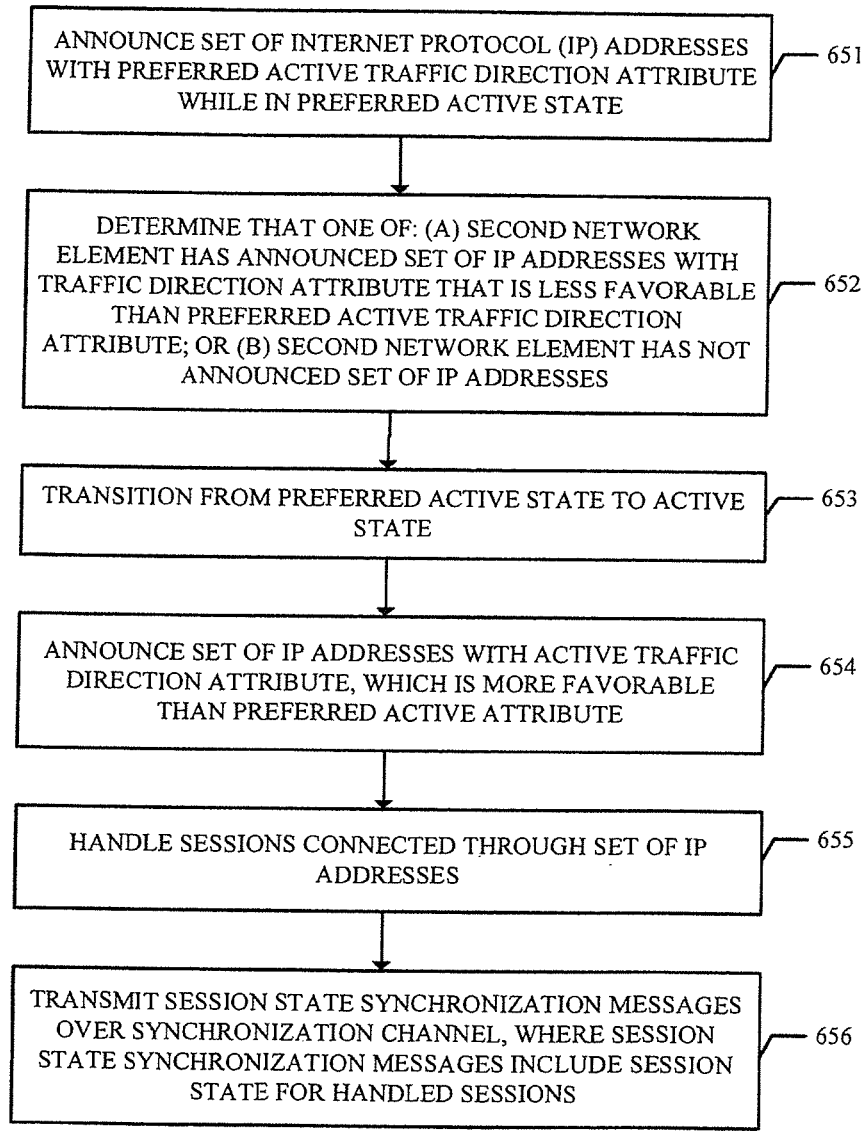
FIG. 6 is a block flow diagram of an embodiment of a method, which is performed by a first network element of an ICR system, of starting up a first, preferred active network element utilizing two different traffic direction attribute levels.

FIG. 6 is a block flow diagram of an embodiment of a method 650, which is performed by a first network element of an ICR system, of starting up a first, preferred active network element utilizing two different traffic direction attribute levels. A set of IP addresses are announced with a preferred active traffic direction attribute, while the first network element is in a preferred active state, at block 651. At block 652, a determination is made that either the second network element has announced the set of IP addresses with a traffic direction attribute that is less favorable than the preferred active traffic direction attribute, or the second network element has not announced the set of IP addresses. The state of the network element is transitioned from the preferred active state to an active state, at block 653. The set of IP addresses are announced with the active traffic direction attribute, at block 654. The active traffic direction attribute is more favorable than the preferred active traffic direction attribute. Sessions connected through the set of IP addresses are handled, at block 655. Session state synchronization messages are transmitted over a synchronization channel, at block 656. The messages include session state for the handled sessions.

Figure 7:
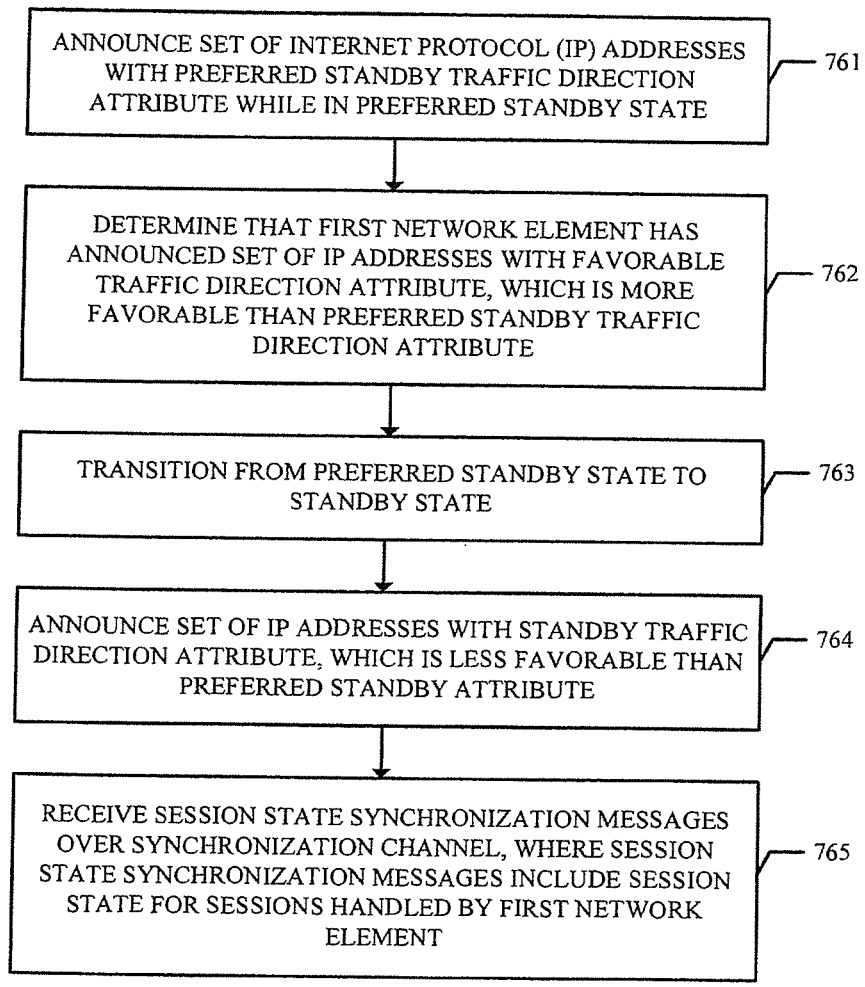
FIG. 7 is a block flow diagram of an embodiment of a method, which is performed by a second network element of an ICR system, of starting up a second, preferred standby network element utilizing two different traffic direction attribute levels.

FIG. 7 is a block flow diagram of an embodiment of a method 760, which is performed by a second network element of an ICR system, of starting up a second, preferred standby network element utilizing two different traffic direction attribute levels. A set of IP addresses are announced with a preferred standby traffic direction attribute, while the second network element is in a preferred standby state, at block 761. At block 762, a determination is made that the first network element has announced the set of IP addresses with a favorable traffic direction attribute that is more favorable than the preferred standby traffic direction attribute. The state of the network element is transitioned from the preferred standby state to a standby state, at block 763. The set of IP addresses are announced with the standby traffic direction attribute, at block 764. The standby traffic direction attribute is less favorable than the preferred standby traffic direction attribute. Session state synchronization messages are received over a synchronization channel, at block 765. The messages include session state for the sessions handled by the first network element.

FIGS. 6-7 illustrate example embodiments of ways of using more than two different traffic direction attribute levels. Other embodiments of using more than two different traffic direction attribute levels are also contemplated. For example, in another embodiment, the first and second network elements may come up concurrently in a preferred active state, and both may announce or provide a preferred active traffic direction attribute. A split brain procedure may be used to resolve which of the network elements is to be active and which standby. For example, control messages may be exchanged over the synchronization channel between the network elements to resolve which of the network elements is to be active and which standby. The network element that is to be active may transition from the preferred active state to the active state and provide an active traffic direction attribute, while the network element that is to be standby may transition to the standby state and provide a standby traffic direction attribute. As yet another embodiment, the first and second network elements may come up at about the same time in a preferred active state, and whichever network element comes up first may detect that the other is not providing a higher traffic direction attribute and may transition to active and provide an active traffic direction attribute. The other network element may notice the active traffic direction attribute, transition from preferred active to standby, and provide the standby traffic direction attribute.

Figure 8:
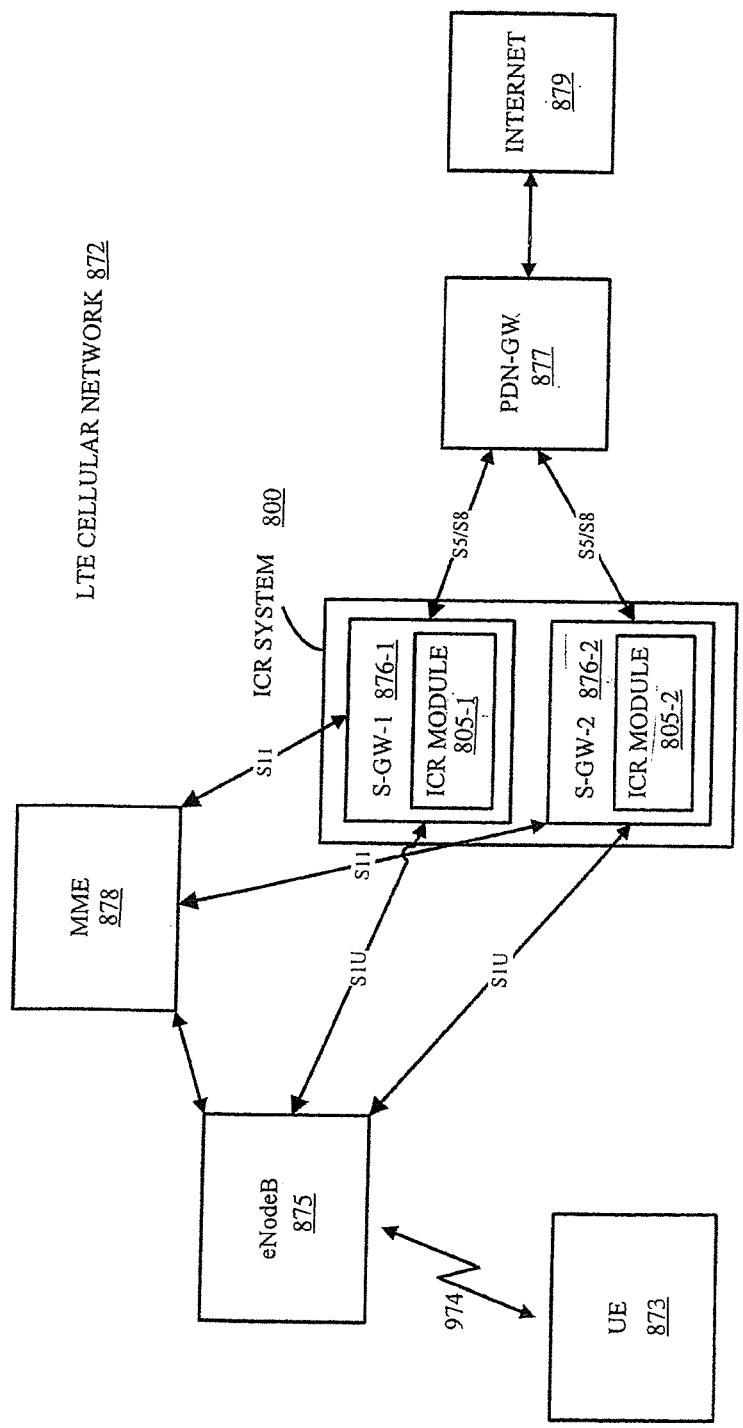
FIG. 8 is a block diagram of an example embodiment of a 3rd Generation Partnership Project (3GPP) Long Term Evolution (LTE) architecture cellular network suitable for implementing embodiments of the invention.

FIG. 8 is a block diagram of an example embodiment of a 3rd Generation Partnership Project (3GPP) Long Term Evolution (LTE) architecture cellular network 872 suitable for implementing embodiments of the invention. User devices or equipment 873 (e.g., mobile phones, laptops, and other wireless devices) establish wireless connections 874 with the network through an eNodeB 875. The eNodeB represents the LTE network base station. Although one eNodeB is shown, there often may be other base stations. The user data (e.g., IP packets) from/to the user equipment (UE) may be handled by two different types of LTE network entities, referred to as a Serving Gateway (S-GW) 876 and a Packet Data Network Gateway (PDN-GW) 877. The S-GW and the PDN-GW are subcomponents of System Architecture Evolution (SAE) which represents the core network architecture of LTE. The main component or core of SAE is known as the SAE core or Evolved Packet Core (EPC). The S-GW and PDN-GW are logically separated entities according to LTE, although they may be physically deployed on either one or more physical network elements/chassis.

A first S-GW 876-1-1 and a second S-GW 876-2 are shown. Each of the S-GWs is coupled or in communication with the eNodeB by a respective user plane interface (S1U). These interfaces may handle the per-bearer user plane tunneling and inter eNodeB path switching during handover. In one aspect, the transport protocol over these interfaces is GPRS Tunneling Protocol-User plane (GTP-U). The S-GWs may receive user data over the S1U interfaces, and also buffer downlink IP packets destined for user equipment (UE) that happen to be in idle mode. Each of the S-GWs is coupled or in communication with the PDN-GW by a respective S5/S8 interface. The S5/S8 interfaces may provide user plane tunneling and tunnel management between the S-GWs and the PDN-GW, may be used for S-GW relocation due to user equipment (UE) mobility. Each of the S-GWs is coupled or in communication with a Mobility Management Entity (MME) 878 by a respective S11 interface. The PDN-GW may serve as a gateway towards external IP networks (e.g., the Internet) 879. The PDN-GW may also include logic for IP address allocation, charging, packet filtering, policy-based control of flows, etc. The network may include other network elements, such as one or more routers between the eNodeB and the S-GW, between the S-GW and the PDN-GW, and/or between the PDN-GW and the Internet.

In the illustrated example embodiment, the first and second S-GWs form an ICR system 800, although the scope of the invention is not so limited. If desired, the first and second S-GWs may be at different geographical locations to provide geographically distributed redundancy. The first S-GW has a first example embodiment of an ICR module 805-1 and the second S-GW has a second example embodiment of an ICR module 805-2. The ICR modules may be similar to or the same as those described elsewhere herein and/or may perform methods similar to or the same as those described elsewhere herein. The IP addresses may be used for the S1U, S5/S8, and S11 interfaces. In some embodiments, in the event of failure of one set of IP addresses (e.g., a set of S1U/S11 virtual IP addresses), the active network element may proactively withdraw another set of IP addresses (e.g., a set of S5/S8 virtual IP addresses). In addition, or alternatively, pairs of other network elements (e.g., PDN-GWs) may form an ICR system. In still other embodiments, two or more other types of network elements of a cellular or other network, may have ICR modules and perform methods disclosed herein. Embodiments are applicable to various different types of Layer 2 or Layer 3 network elements in various different types of networks where providing ICR is desired.

While embodiments of the invention have been described in relation to two network elements participating in a redundancy mechanism, other embodiments may include three or more network elements participating in a redundancy mechanism. For example, an active network element may have two or more full backup network elements, an active network element may portions of its backup spread across two or more standby network elements, etc.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media. A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like. The tangible storage media may include one or more solid or tangible physical materials, such as, for example, a semiconductor material, a phase change material, a magnetic material, etc. Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein. A few representative examples of non-tangible transitory computer-readable communication or transmission media include, but are not limited to, electrical, optical, acoustical or other form of propagated signals—such as carrier waves, infrared signals, digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method performed by a first network element of an inter-chassis redundancy (ICR) system, the first network element coupled with a second network element of the ICR system by a synchronization channel, of cooperating with the second network element to provide ICR, said method comprising the steps of:
announcing a set of Internet Protocol (IP) addresses with a favorable traffic direction attribute, wherein said announcing the set of IP addresses with the favorable traffic direction attribute comprises announcing the set of IP addresses with a preferred active traffic direction attribute;
determining that one of: (a) the second network element has announced the set of IP addresses with an unfavorable traffic direction attribute that is less favorable than the favorable traffic direction attribute; and (b) the second network element has not announced the set of IP addresses;
after determining that either the second network element has announced the set of IP addresses with the unfavorable traffic direction attribute or the second network element has not announced the set of IP addresses, announcing the set of IP addresses with an active traffic direction attribute, wherein the active traffic direction attribute is more favorable than the preferred active traffic direction attribute;
handling sessions that are connected through the set of IP addresses;
transmitting session state synchronization messages over the synchronization channel to the second network element, wherein the session state synchronization messages include session state for the handled sessions; and
determining, after an occurrence of a failure event that inhibits the first network element from handling the sessions, that the set of IP addresses have been announced by the second network element with the favorable traffic direction attribute.

2. The method of claim 1, further comprising a step of detecting the failure event using a fast failure event detection protocol.

3. The method of claim 2, wherein using the fast failure event detection protocol comprises a Bidirectional Forwarding Detection (BFD) protocol.

4. The method of claim 1, wherein the step of transmitting the session state synchronization messages comprises transmitting User Datagram Protocol (UDP) messages that include the session state in type-length-value (TLV) elements.

5. The method of claim 1, wherein the step of announcing the set of the IP addresses with the preferred active traffic direction attribute comprises announcing the set of the IP addresses at one of a serving gateway (S-GW) and a packet data network gateway (PDN-GW).

6. A first network element of an inter-chassis redundancy (ICR) system, the first network element operable to be coupled with a second network element of the ICR system by a synchronization channel, the first network element operable to cooperate with the second network element to provide ICR, said first network element comprising:
at least one control card;
at least one line card coupled with the at least one control card, the at least one line card configured to be accessible through a set of Internet Protocol (IP) addresses;
a traffic direction module;
a traffic direction controller module operable to initially control the traffic direction module to announce the set of IP addresses with a favorable traffic direction attribute, wherein the traffic direction controller module is operable to initially control the traffic direction module to announce the set of IP addresses with a preferred active traffic direction attribute;
an ICR state determination module operable to determine an active state for the first network element based on a determination that one of: (a) the second network element has announced the set of IP addresses with an unfavorable traffic direction attribute that is less favorable than the favorable traffic direction attribute; and (b) the second network element has not announced the set of IP addresses;
wherein the traffic direction controller module is operable, after the ICR state determination module determines the active state, to control the traffic direction module to announce the set of IP addresses with an active traffic direction attribute, wherein the active traffic direction attribute is more favorable than the preferred active traffic direction attribute;
a session handler module operable to handle sessions established through the set of IP addresses while the first network element is in the active state;
a session state synchronization module operable to transmit session state synchronization messages over the synchronization channel to the second network element, wherein the session state synchronization messages include session state for the handled sessions; and
wherein the traffic direction controller module, after an occurrence of a failure event that is capable of inhibiting the first network element from handling the sessions, and after a determination that the second network element has announced the set of IP addresses with a favorable traffic direction attribute, is operable to control the traffic direction module to perform one of: (a) announce the set of IP addresses with the unfavorable traffic direction attribute; and (b) not announce the set of IP addresses.

7. The first network element of claim 6, further comprising a fast forward detection protocol module operable to detect a failure in a link through an IP address of the set of IP addresses.

8. The first network element of claim 7, wherein the fast forward detection protocol module comprises a Bidirectional Forwarding Detection (BFD) module.

9. The first network element of claim 6, wherein the first network element comprises one of a serving gateway (S-GW) and a packet data network gateway (PDN-GW).

10. The first network element of claim 6, wherein the session state synchronization module is operable to transmit the session state synchronization messages as User Datagram Protocol (UDP) messages that include the session state in type-length-value (TLV) elements.

11. A method performed by a second network element of an inter-chassis redundancy (ICR) system, the second network element coupled with a first network element of the ICR system by a synchronization channel, of cooperating with the first network element to provide ICR, said method comprising the steps of:
announcing a set of Internet Protocol (IP) addresses with an unfavorable traffic direction attribute, wherein the announcing the set of IP addresses with the unfavorable traffic direction attribute comprises announcing the set of IP addresses with a preferred standby traffic direction attribute;
determining that the first network element has announced the set of IP addresses with a favorable traffic direction attribute that is more favorable than the unfavorable traffic direction attribute;
after determining that the first network element has announced the set of IP addresses with the favorable traffic direction attribute, announcing the set of IP addresses with a standby traffic direction attribute, wherein the standby traffic direction attribute is less favorable than the preferred standby traffic direction attribute;
receiving session state synchronization messages over the synchronization channel from the first network element, wherein the session state synchronization messages include session state for sessions handled by the first network element;
determining that the set of IP addresses are no longer being announced;
announcing the set of IP addresses with the favorable traffic direction attribute that is more favorable than the unfavorable traffic direction attribute; and
handling the sessions using the session state from the received session state synchronization messages.

12. The method of claim 11, wherein the step of receiving the session state synchronization messages comprises receiving the session state synchronization messages at one of a serving gateway (S-GW) and a packet data network gateway (PDN-GW).

13. The method of claim 11, further comprising transmitting session state synchronization messages over the synchronization channel to the first network element, wherein the transmitted session state synchronization messages include session state for the sessions handled by the second network element.

14. A second network element of an inter-chassis redundancy (ICR) system, the second network element operable to be coupled with a first network element by a synchronization channel, the second network element operable to cooperate with the first network element to provide ICR, said second network element comprising:
at least one control card;
at least one line card coupled with the at least one control card, the at least one line card configured to be accessible through a set of Internet Protocol (IP) addresses;
a traffic direction module;
a traffic direction controller module operable to control the traffic direction module to announce the set of IP addresses with an unfavorable traffic direction attribute, wherein the unfavorable traffic direction attribute comprises a preferred standby traffic direction attribute;
an ICR state determination module operable to determine a standby ICR state for the second network element, after announcement of the set of IP addresses with the preferred standby traffic direction attribute, based on a determination that the first network element has announced the set of IP addresses with a favorable traffic direction attribute that is more favorable than the unfavorable traffic direction attribute;
wherein the traffic direction controller module is operable, after the ICR state determination module determines the standby state, to control the traffic direction module to announce the set of IP addresses with a standby traffic direction attribute;
a session state synchronization module operable to receive session state synchronization messages over the synchronization channel from the first network element, wherein the session state synchronization messages are to include session state for sessions handled by the first network element;
wherein, in response to a determination that the set of IP addresses are no longer being announced by the first network element, the traffic direction controller module is operable to control the traffic direction module to announce the set of IP addresses with the favorable traffic direction attribute that is more favorable than the unfavorable traffic direction attribute; and
a session handler module operable to handle sessions that are to be established through the set of IP addresses using the session state from the received session state synchronization messages.

15. The second network element of claim 14, wherein the second network element comprises one of a serving gateway (S-GW) and a packet data network gateway (PDN-GW).

* * * * *